(12) United States Patent
Doggett et al.

(10) Patent No.: US 11,749,265 B2
(45) Date of Patent: Sep. 5, 2023

(54) TECHNIQUES FOR INCREMENTAL COMPUTER-BASED NATURAL LANGUAGE UNDERSTANDING

(71) Applicant: DISNEY ENTERPRISES, INC., Burbank, CA (US)

(72) Inventors: Erika Varis Doggett, Los Angeles, CA (US); Ashutosh Modi, Dwarka (IN); Nathan Nocon, Valencia, CA (US)

(73) Assignee: DISNEY ENTERPRISES, INC., Burbank, CA (US)

(*) Notice: Subject to any disclaimer, the term of this patent is extended or adjusted under 35 U.S.C. 154(b) by 340 days.

(21) Appl. No.: 16/593,939

(22) Filed: Oct. 4, 2019

(65) Prior Publication Data

US 2021/0104236 A1   Apr. 8, 2021

(51) Int. Cl.
| G10L 15/22 | (2006.01) |
| G10L 15/18 | (2013.01) |
| G10L 15/197 | (2013.01) |
| G10L 15/24 | (2013.01) |
| G10L 15/04 | (2013.01) |

(52) U.S. Cl.
CPC ............. *G10L 15/22* (2013.01); *G10L 15/04* (2013.01); *G10L 15/1815* (2013.01); *G10L 15/197* (2013.01); *G10L 15/24* (2013.01); *G10L 2015/223* (2013.01)

(58) Field of Classification Search
CPC ... G10L 15/22; G10L 15/1815; G10L 15/197; G10L 15/24; G10L 15/04; G10L 2015/223; G10L 25/48; G10L 15/1822

USPC .......................................................... 704/235
See application file for complete search history.

(56) References Cited

U.S. PATENT DOCUMENTS

| 8,041,565 | B1 * | 10/2011 | Bhardwaj | G10L 15/28 |
| | | | | 704/235 |
| 9,361,084 | B1 * | 6/2016 | Costa | G06F 8/61 |
| 9,437,186 | B1 * | 9/2016 | Liu | G10L 15/22 |
| 10,224,030 | B1 * | 3/2019 | Kiss | G06F 40/284 |
| 10,403,272 | B1 * | 9/2019 | Fanty | H04L 65/403 |
| 10,497,250 | B1 * | 12/2019 | Hayward | G06F 16/29 |
| 10,499,146 | B2 * | 12/2019 | Lang | H04W 8/005 |
| 11,062,696 | B2 * | 7/2021 | Tadpatrikar | G10L 15/065 |
| 11,086,858 | B1 * | 8/2021 | Koukoumidis | G06F 18/2411 |
| 11,087,750 | B2 * | 8/2021 | Ganong, III | H04M 1/724 |
| 11,211,058 | B1 * | 12/2021 | Eakin | G10L 15/197 |
| 2003/0236664 | A1 * | 12/2003 | Sharma | G10L 15/08 |
| | | | | 704/251 |
| 2005/0261905 | A1 * | 11/2005 | Pyo | G10L 13/10 |
| | | | | 704/E15.04 |
| 2008/0226058 | A1 * | 9/2008 | Das | H04M 3/527 |
| | | | | 704/E15.001 |

(Continued)

*Primary Examiner* — Thuykhanh Le
(74) *Attorney, Agent, or Firm* — Artegis Law Group, LLP

(57) ABSTRACT

Various embodiments disclosed herein provide techniques for performing incremental natural language understanding on a natural language understanding (NLU) system. The NLU system acquires a first audio speech segment associated with a user utterance. The NLU system converts the first audio speech segment into a first text segment. The NLU system determines a first intent based on a text string associated with the first text segment, wherein the text string represents a portion of the user utterance. The NLU system generates a first response based on the first intent prior to when the user utterance completes.

18 Claims, 8 Drawing Sheets

(56) References Cited

U.S. PATENT DOCUMENTS

| | | | | |
|---|---|---|---|---|
| 2009/0112590 | A1* | 4/2009 | Pulz | G10L 15/187 704/E15.046 |
| 2009/0275316 | A1* | 11/2009 | Springer | G06Q 10/10 455/415 |
| 2012/0034904 | A1* | 2/2012 | LeBeau | H04W 4/046 455/414.1 |
| 2013/0132079 | A1* | 5/2013 | Sehgal | G10L 15/22 704/235 |
| 2014/0025383 | A1* | 1/2014 | Dai | G10L 13/00 704/260 |
| 2014/0058732 | A1* | 2/2014 | Labsky | G10L 15/30 704/E15.005 |
| 2015/0053781 | A1* | 2/2015 | Nelson | F24F 11/30 236/10 |
| 2016/0063118 | A1* | 3/2016 | Campbell | G06F 16/9535 707/722 |
| 2016/0104486 | A1* | 4/2016 | Penilla | G10L 15/02 704/232 |
| 2016/0358605 | A1* | 12/2016 | Ganong, III | G10L 15/30 |
| 2017/0075879 | A1* | 3/2017 | Sakamoto | G10L 15/26 |
| 2017/0359707 | A1* | 12/2017 | Diaconu | G06F 9/54 |
| 2017/0366909 | A1* | 12/2017 | Mickelsen | H04R 3/06 |
| 2018/0032884 | A1* | 2/2018 | Murugeshan | G06F 40/35 |
| 2018/0068660 | A1* | 3/2018 | Kawahara | G10L 15/26 |
| 2018/0232436 | A1* | 8/2018 | Elson | G06Q 10/10 |
| 2018/0357286 | A1* | 12/2018 | Wang | G06F 16/24578 |
| 2019/0027135 | A1* | 1/2019 | Kim | G06F 3/167 |
| 2019/0042560 | A1* | 2/2019 | Kakirwar | G06F 40/295 |
| 2019/0095171 | A1* | 3/2019 | Carson | G06F 16/3344 |
| 2019/0206397 | A1* | 7/2019 | Zhou | G10L 15/26 |
| 2019/0244619 | A1* | 8/2019 | Kwon | G10L 15/22 |
| 2019/0290965 | A1* | 9/2019 | Oren | A63B 24/0075 |
| 2019/0318219 | A1* | 10/2019 | Arora | G06N 5/04 |
| 2019/0378493 | A1* | 12/2019 | Kim | G10L 15/05 |
| 2019/0394547 | A1* | 12/2019 | Lemons | H04R 1/028 |
| 2020/0027455 | A1* | 1/2020 | Sugiyama | G06F 3/16 |
| 2020/0074993 | A1* | 3/2020 | Lee | G10L 15/22 |
| 2020/0098346 | A1* | 3/2020 | Kemmerer | G10K 11/17854 |
| 2020/0135212 | A1* | 4/2020 | Cho | G10L 17/22 |
| 2020/0168220 | A1* | 5/2020 | Magielse | G10L 17/22 |
| 2020/0273448 | A1* | 8/2020 | Min | G06N 3/084 |
| 2020/0302112 | A1* | 9/2020 | Helm | G10L 15/08 |
| 2020/0335128 | A1* | 10/2020 | Sheeder | G10L 15/04 |
| 2020/0342858 | A1* | 10/2020 | Gupta | G10L 15/22 |
| 2020/0342862 | A1* | 10/2020 | Gao | G10L 15/26 |
| 2021/0026896 | A1* | 1/2021 | Lecaros Easton | H04L 51/02 |
| 2021/0049237 | A1* | 2/2021 | Demme | G06Q 20/4018 |
| 2021/0280180 | A1* | 9/2021 | Skobeltsyn | G10L 15/18 |

* cited by examiner

US 11,749,265 B2

TECHNIQUES FOR INCREMENTAL COMPUTER-BASED NATURAL LANGUAGE UNDERSTANDING

BACKGROUND

Field of the Various Embodiments

The various embodiments relate generally to computer-based language processing technology and, more specifically, to techniques for incremental computer-based natural language understanding.

Description of the Related Art

Computer-based natural language understanding (NLU) has become a widely popular approach for facilitating human-machine interfaces (HMI) between human users and computer systems. Computer-based NLU is typically included as part of a dialogue system. Such dialogue systems are often deployed in automated chat-based applications, referred to herein as "chatbots," personal digital assistants, and artificial intelligence (AI) avatars. Typically, a computer-based dialogue system receives audio input from a user via an audio input device, such as a microphone. Notably, the dialogue system waits until an entire spoken utterance from the user has been processed by an automatic speech recognition (ASR) module and received before taking any responsive actions. Such an ASR module can employ various techniques for determining that an entire utterance has been received from a user. For example, the ASR module could wait for a detectable pause in the audio input of a certain duration before concluding that the entirety of a user utterance has been received. The ASR module system then converts the audio input representing the user utterance into text. Then, the dialogue system analyzes the text, and generates an appropriate response. The response is usually in the form of text output, an audio output, and/or a visual output.

One drawback of conventional dialogue systems is that, because a dialogue system does not begin processing until after an entire user utterance has been received, the dialogue system does not generate any responses while a person is speaking, which can feel quite unnatural to the user. For example, during a typical verbal interaction between two people, each person interjects verbal and non-verbal communications into the interaction. In that regard, while the person is speaking, the second person could interject phrases, such as "uh huh," "I understand," "I'm so sorry," and "I'm very happy for you," in response to what the first person is saying. Similarly, the second person also could interject non-verbal expressions, such as winces, smiles, frowns, grimaces, or other facial expressions, in response to what the first person is saying. As noted above, conventional automated dialogue systems do not interject verbal or non-verbal communications into interactions with users, while the users are speaking. Accordingly, interactions with dialogue systems can feel "robotic" and "stiff" to users, which decreases the quality of the overall user experience.

As the foregoing illustrates, what is needed in the art are more effective techniques for implementing human-machine interfaces using natural language understanding.

SUMMARY

Various embodiments disclosed herein provide a method for performing incremental natural language understanding. The method includes acquiring a first audio speech segment associated with a user utterance. The method further includes converting the first audio speech segment into a first text segment. The method further includes determining a first intent based on a text string associated with the first text segment, wherein the text string represents a portion of the user utterance. The method further includes generating a first response based on the first intent prior to when the user utterance completes. The method further includes preparing for a first response or other action based on the first intent prior to when the user utterance completes.

Other embodiments include, without limitation, one or more non-transitory computer-readable media storing instructions for performing one or more aspects of the disclosed techniques, as well as a system for performing one or more aspects of the disclosed techniques.

At least one technical advantage of the disclosed techniques relative to the prior art is that the disclosed techniques enable a dialogue system to verbally and/or visually respond to audio received from a user as the user is speaking, without having to wait for the user to finish speaking. Thus, the disclosed techniques allow the dialogue system to interact with the user in a more natural, "human-like" manner, thereby enhancing the overall user experience. These technical advantages represent one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1A:
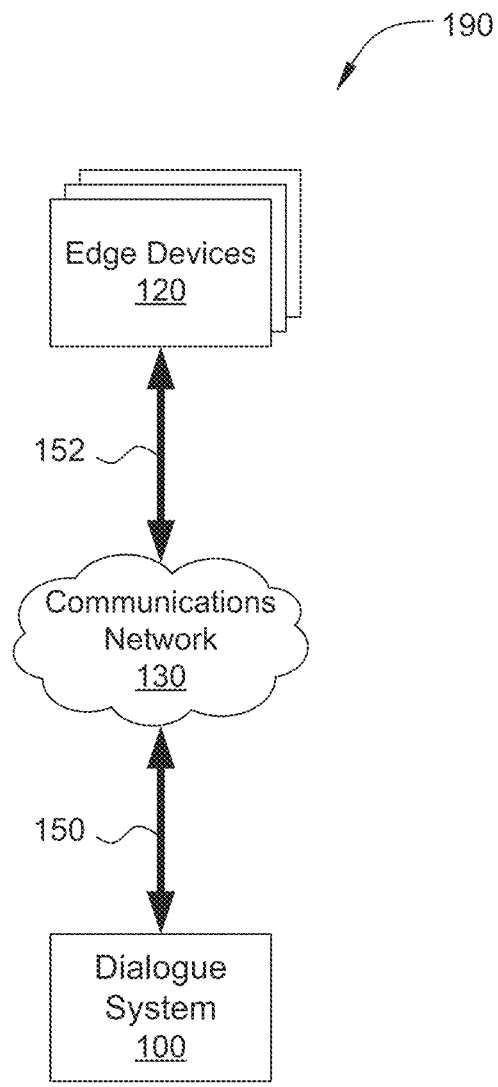
FIG. 1A illustrates a system configured to implement one or more aspects of the various embodiments.

In the following description, numerous specific details are set forth to provide a more thorough understanding of the various embodiments. However, it will be apparent to one of skill in the art that the various embodiments may be practiced without one or more of these specific details.

As further described herein, a dialogue system performs incremental automatic speech recognition and incremental natural language understanding on short segments of audio speech input in real-time. In contrast to conventional approaches, the dialogue system does not wait to receive a complete user utterance before starting to analyze and respond to audio speech input. Instead, the dialogue system generates textual, verbal, and/or visual responses as audio speech input is received. User utterances are divided into smaller portions, such as characters, words, phonological phrases, or any technically feasible portions thereof. As used herein, a phonological phrase is a portion of a user utterance. A phonological phrase is typically not a full sentence. Instead, a phonological phrase is typically a phrase within a sentence. In general, audio markers are used to determine the beginning and ending of phonological phrases. These audio markers include, without limitation, intonation cues, verbal pauses, and other base cues.

The smaller portions are converted into text segments, and the text segments are analyzed to generate the predicted intent of the speaker. The dialogue system performs additional processing to further refine the predicted intent, such as by analyzing the audio speech input for user intonation cues. The dialogue system further analyzes various other verbal and non-verbal inputs to refine the predicted intent, such as cultural factors, inflections, predicted mood or emotion. The dialogue system further analyzes information from video feeds of the speaker as the speaker is talking and as the speaker is reacting to responses generated by the dialogue system. The dialogue system generates incrementally predicted intents before the full user utterance is received. The dialogue system compares a confidence score for a predicted intent against a threshold value. If the confidence score for the predicted intent is greater than the threshold value, then the dialogue system generates an appropriate context-specific response, based on the predicted intent. In addition to generating predicted intents, the dialogue system analyzes and predicts other aspects of the utterance received from the user. More particularly, the dialogue system analyzes and predicts sentiment, stance, emotion, topic, and various other elements of meaning associated with the utterance.

A natural language generation (NLG) system associated with or included in the dialogue system generates responses, and/or prepares for responses and other actions, for controlling an interactive character, such as a chatbot, a personal digital assistant, or an AI avatar. For example, if the user reacts in a certain way as the interactive character is speaking, then the dialogue system modifies the response of the interactive character in real-time before the speaker has finished talking. The dialogue system allows for programming additional personality traits that influence the responses of the interactive character, such as excitability, curiosity, and propensity to interrupt the speaker. The NLG system associated with the dialogue system continues to generate responses and/or prepare for responses and other actions based on the first intent prior to when the user utterance completes, such as interrupting and nodding head in agreement, to animate the interactive character based on the predicted intent of the speaker. An overview of the dialogue system is now described in further detail.

System Overview

FIG. 1A illustrates a system 190 configured to implement one or more aspects of the present invention. As shown, the system 190 includes, without limitation, edge devices 120 and a dialogue system 100 in communication with each other via a computer network 130.

Computer network 130 may be any suitable environment to enable communications among remote or local computer systems and computing devices, including, without limitation, point-to-point communications channels, Bluetooth, WiFi, cable-based networks, fiber optic networks, 4G and 5G cellular networks, infrared communications, wireless and wired LANs (Local Area Networks), and one or more internet-based WANs (Wide Area Networks).

Each edge device 120 includes, without limitation, a computing device that may be a personal computer, personal digital assistant, mobile phone, mobile device, smart speaker, vehicle, gaming device, interactive experience environment, interactive attraction, or any other device or environment suitable for implementing one or more aspects of the present invention. Illustratively, the edge device 120 communicates over network 130 via communications link 152.

In operation, the edge device 120 receives audio, visual and other information associated with utterances spoken by a user. The edge device 120 receives audio information via an audio input device, such as a microphone. Further, the edge device 120 receives visual information via a video input device, such as a camera. The edge device 120 may receive the audio, visual and other information in analog or digital form. If the edge device 120 receives the audio, visual and other information in analog form, the edge device may perform analog-to-digital conversion to convert the information into digital form. The edge device 120 transmits the audio, visual and other information, in analog and/or digital form, to the dialogue system 100. In response, the dialogue system 100 transmits one or more responses to the edge device 120. The responses may include text, audio, and/or visual information. Further, the responses may be in analog or digital form. The edge device 120 presents the response on one or more output devices. The edge device 120 presents audio information via an audio output device, such as one or more speakers. Further, the edge device 120 presents text and/or visual information via a video output device, such as a display device.

The dialogue system 100, includes, without limitation, a computing device that may be a standalone server, a cluster or "farm" of servers, one or more network appliances, or any other device suitable for implementing one or more aspects of the present invention. The dialogue system 100 includes any one or more of local servers, remote servers, or cloud-based servers, in any technically feasible combination. Illustratively, the dialogue system 100 communicates over computer network 130 via communications link 150.

In operation, the dialogue system 100 acquires input information of short duration, such as audio speech segments, visual information, and other information, from one or more edge devices 120. The dialogue system 100 converts each audio speech segment into a text segment via an automatic speech recognition process. The resulting text segment includes one or more letters that represent a portion of one or more words. Additionally or alternatively, the resulting text segment includes one or more words that represent a portion of a user utterance. The dialogue system 100 concatenates the text segment with other previously acquired text segments belonging to the same user utterance, thereby generating a concatenated text string. The dialogue system 100 then identifies one or more predicted intent results based on the concatenated text string. If the dialogue system 100 determines that the confidence scores for the predicted intent results are less than corresponding threshold values, then the dialogue system 100 generates one or more backchannel responses that are not context-specific. If, on the other hand, the dialogue system 100 determines that one or more confidence scores for the predicted intent results are greater than corresponding threshold values, then the dialogue system 100 generates one or more context-specific AI responses.

As the dialogue system 100 acquires and processes additional audio speech segments of short duration, the dialogue system 100 generates a more complete context of the user utterance being spoken and, correspondingly, an increasingly refined model of the predicted intent of the speaker. In response, the dialogue system 100 continues to generate backchannel responses and AI responses that correspond to this increasingly complete and refined model of the predicted intent of the speaker. In addition, the dialogue system 100 modifies the backchannel responses and AI responses with personality markers that define various personality traits of the chatbot, personal digital assistant, AI avatar or other responder associated with the dialogue system 100. The dialogue system 100 further modifies the backchannel responses and AI responses based on intonation cues detected from the audio speech input, such as whether the speaker's voice is rising or trailing. The dialogue system 100 further modifies the backchannel responses and AI responses based on analysis of one or more video feeds of the speaker who is generating the user utterance.

Figure 1B:
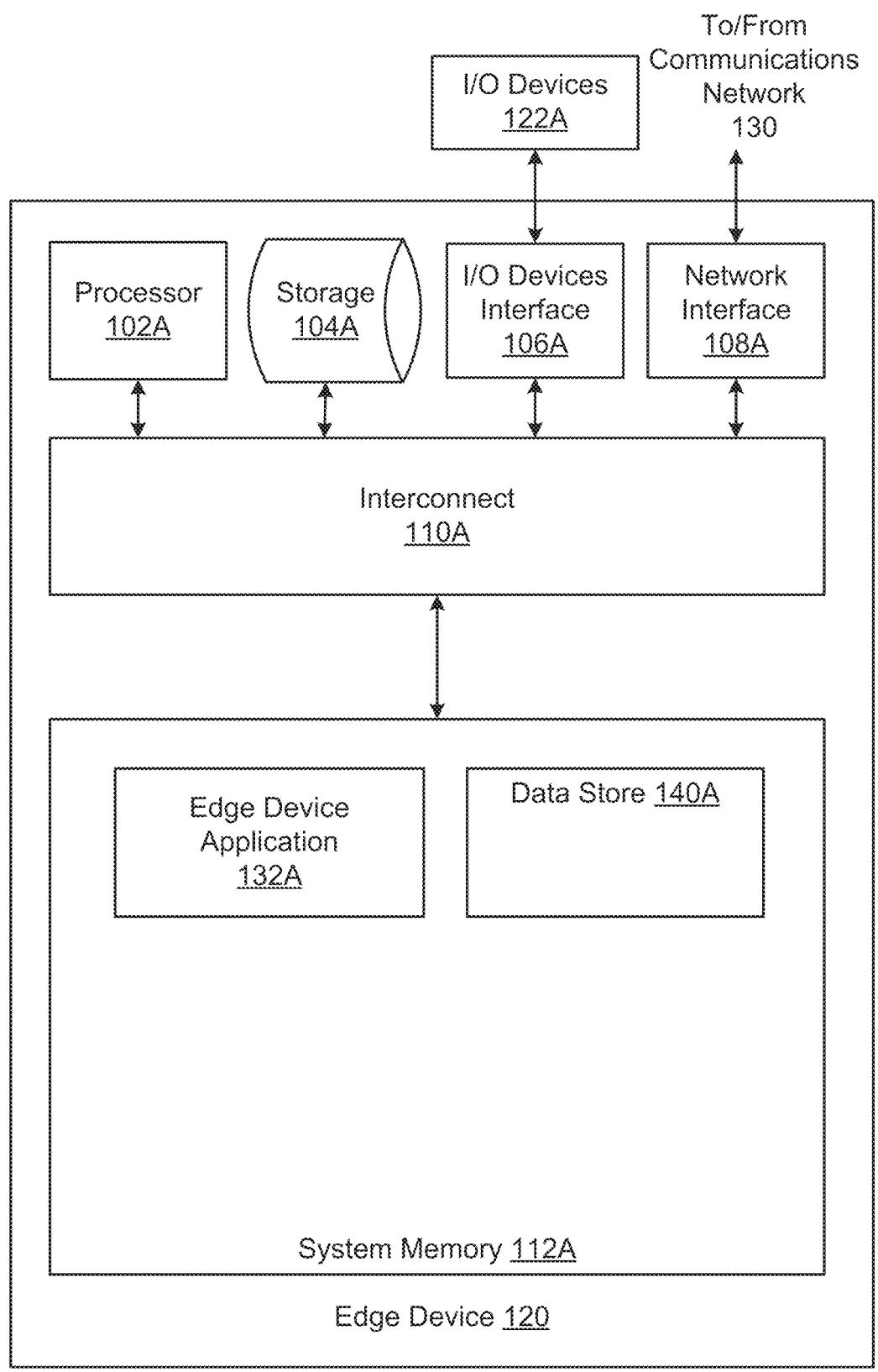
FIG. 1B illustrates a more detailed view of one of the edge devices of FIG. 1A, according to various embodiments.

FIG. 1B illustrates a more detailed view of one of the edge devices 120 of FIG. 1A, according to various embodiments. As shown, the dialogue system 100 includes, without limitation, a processor 102A, storage 104A, an input/output (I/O) devices interface 106A, a network interface 108A, an interconnect 110A, and a system memory 112A.

The processor 102A retrieves and executes programming instructions stored in the system memory 112A. Similarly, the processor 102A stores and retrieves application data residing in the system memory 112A. The interconnect 110A facilitates transmission, such as of programming instructions and application data, between the processor 102A, input/output (I/O) devices interface 106A, storage 104A, network interface 108A, and system memory 112A. The I/O devices interface 106A is configured to receive input data from user I/O devices 122A. Examples of user I/O devices 122A may include one of more buttons, a keyboard, and a mouse or other pointing device. The I/O devices interface 106A may also include an audio output unit configured to generate an electrical audio output signal, and user I/O devices 122A may further include a speaker configured to generate an acoustic output in response to the electrical audio output signal. Another example of a user I/O device 122A is a display device that generally represents any technically feasible means for generating an image for display. For example, the display device could be a liquid crystal display (LCD) display, CRT display, or DLP display. The display device may be a TV that includes a broadcast or cable tuner for receiving digital or analog television signals.

Processor 102A is included to be representative of a single central processing unit (CPU), multiple CPUs, a single CPU having multiple processing cores, one or more graphics processing units (GPUs) each having multiple processing cores, and the like. And the system memory 112A is generally included to be representative of a random access memory. The storage 104A may be a disk drive storage device. Although shown as a single unit, the storage 104A may be a combination of fixed and/or removable storage devices, such as fixed disc drives, floppy disc drives, tape drives, removable memory cards, or optical storage, network attached storage (NAS), or a storage area-network (SAN). Processor 102A communicates to other computing devices and systems via network interface 108A, where network interface 108A is configured to transmit and receive data via a communications network, such as communications network 130.

The system memory 112A includes, without limitation, an edge device application 132A and a data store 140A. The edge device application 132A, when executed by the processor 102A, performs one or more operations associated with the edge device 120, as further described herein. Data store 140A provides memory storage for various items associated with the edge device 120, as further described herein. The edge device application 132A stores data in and retrieve data from data store 140A, as further described herein.

In operation, the edge device application 132A receives audio, visual and other information associated utterances spoken by a user. The edge device application 132A receives audio information via an audio input device, such as a microphone. Further, the edge device application 132A receives visual information via a video input device, such as a camera. The edge device application 132A may receive the audio, visual and other information in analog or digital form. If the edge device application 132A receives the audio, visual and other information in analog form, the edge device may perform analog-to-digital conversion to convert the information into digital form. The edge device application 132A transmits the audio, visual and other information, in analog and/or digital form, to the dialogue system 100. In response, the dialogue system 100 transmits one or more responses to the edge device application 132A. The responses may include text, audio, and/or visual information. Further, the responses may be in analog or digital form. The edge device application 132A presents the responses on one or more output devices. The edge device application 132A presents audio information via an audio output device, such as one or more speakers. Further, the edge device application 132A presents text and/or visual information via a video output device, such as a display device.

Figure 1C:
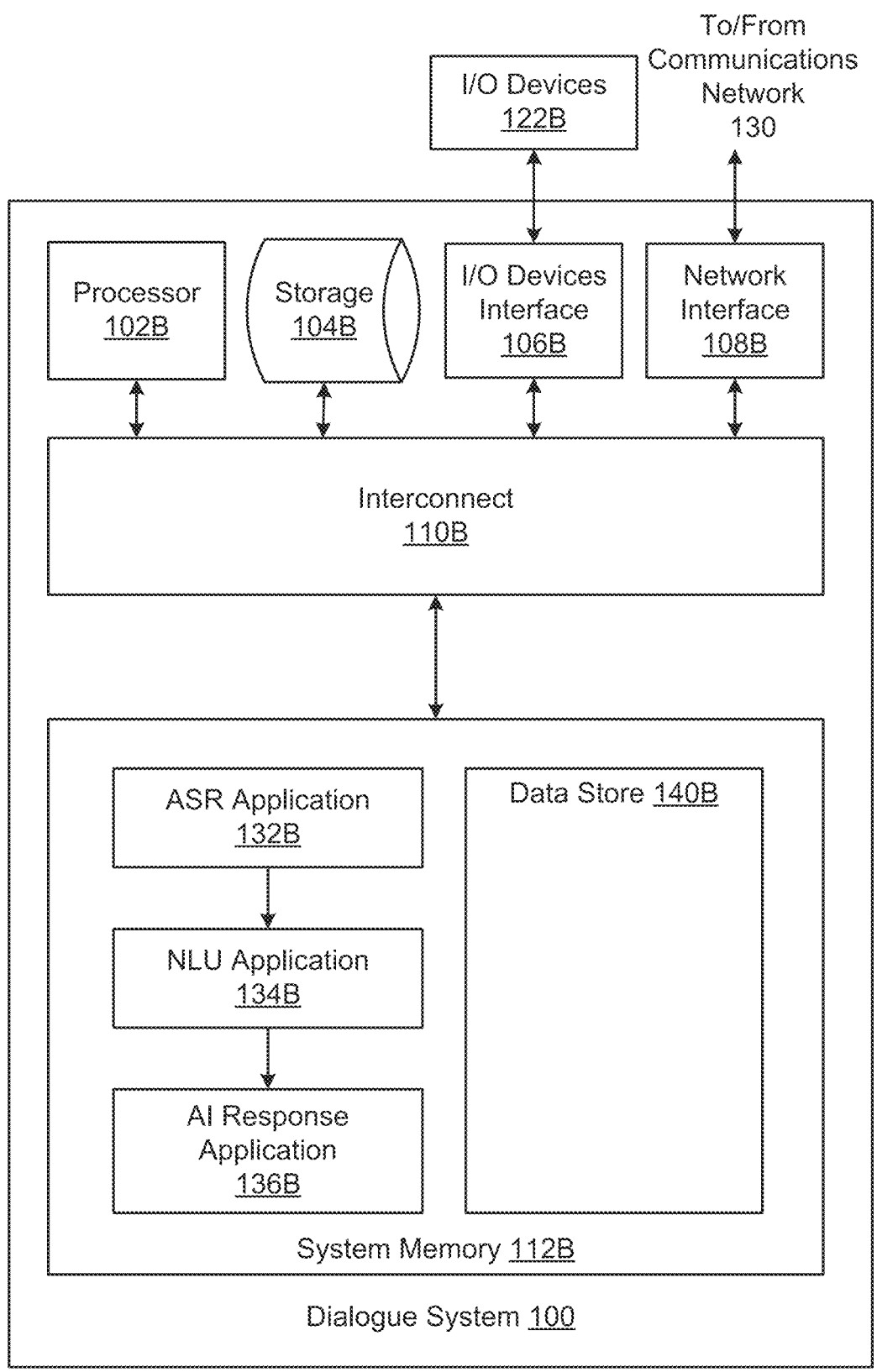
FIG. 1C illustrates a more detailed view of the dialogue system of FIG. 1A, according to various embodiments.

FIG. 1C illustrates a more detailed view of the dialogue system 100 of FIG. 1A, according to various embodiments. As shown, the dialogue system 100 includes, without limitation, a processor 102B, storage 104B, an input/output (I/O) devices interface 106B, a network interface 108B, an interconnect 110B, and a system memory 112B.

The processor 102B retrieves and executes programming instructions stored in the system memory 112B. Similarly, the processor 102B stores and retrieves application data residing in the system memory 112B. The interconnect 110B facilitates transmission, such as of programming instructions and application data, between the processor 102B, input/output (I/O) devices interface 106B, storage 104B, network interface 108B, and system memory 112B. The I/O devices interface 106B is configured to receive input data from user I/O devices 122B. Examples of user I/O devices 122B may include one of more buttons, a keyboard, and a mouse or other pointing device. The I/O devices interface 106B may also include an audio output unit configured to generate an electrical audio output signal, and user I/O devices 122B may further include a speaker configured to generate an acoustic output in response to the electrical audio output signal. Another example of a user I/O device 122B is a display device that generally represents any technically feasible means for generating an image for display. For example, the display device could be a liquid crystal display (LCD) display, CRT display, or DLP display. The display device may be a TV that includes a broadcast or cable tuner for receiving digital or analog television signals.

Processor 102B is included to be representative of a single central processing unit (CPU), multiple CPUs, a single CPU having multiple processing cores, one or more graphics processing units (GPUs) each having multiple processing cores, and the like. And the system memory 112B is generally included to be representative of a random access memory. The storage 104B may be a disk drive storage device. Although shown as a single unit, the storage 104B may be a combination of fixed and/or removable storage devices, such as fixed disc drives, floppy disc drives, tape drives, removable memory cards, or optical storage, network attached storage (NAS), or a storage area-network (SAN). Processor 102B communicates to other computing devices and systems via network interface 108B, where network interface 108B is configured to transmit and receive data via a communications network, such as communications network 130.

The system memory 112B includes, without limitation, an automatic speech recognition (ASR) application 132B, a natural language understanding (NLU) application 134B, an artificial intelligence (AI) response application 136B, and a data store 140B. The ASR application 132B, NLU application 134B, and AI response application 136B, when executed by the processor 102B, performs one or more operations associated with the dialogue system 100, as further described herein. Data store 140B provides memory storage for various items associated with the dialogue system 100, as further described herein. The ASR application 132B, NLU application 134B, and AI response application 136BB store data in and retrieve data from data store 140B, as further described herein.

In operation, the ASR application 132B automatically performs recognition of speech by receiving audio input and converting the audio input into words in the form of text. The ASR application 132B receives audio speech segments, where each audio speech segment represents a certain duration of time. After receiving an audio speech segment, the ASR application 132B begins to generate a text segment that includes the characters and/or words represented by the audio speech segment. The ASR application 132B continues to receive additional audio speech segments and generates corresponding text segments. Further, the ASR application 132B applies a language model to the text segments in order to disambiguate text segments that include homonyms, context-dependent words, and the like. Consequently, the ASR application 132B employs the language model to generate accurate text segments. The ASR application 132B transmits each generated text segment to the NLU application 134B.

In operation, the NLU application 134B extracts understanding and meaning from spoken language. More specifically, the NLU application 134B performs intent recognition and sentiment detection on language that a person has spoken. The NLU application 134B does not directly operate on an incoming audio stream. Instead, the ASR application 132B converts the incoming audio stream to words and other text. Then, the NLU application 134B converts that text to a representation of meaning in the form of predicted intents and sentiments. For example, the NLU application 134B could receive the text string "I hate broccoli" from the ASR application 132B. In response, the NLU application 134B could convert the text string into a representation of a predicted intent and sentiment in the form of "<negative sentiment>[broccoli]," where "<negative sentiment> indicates a sentiment of dislike and [broccoli] specifies the subject of the dislike sentiment.

In particular, the NLU application 134B receives each text segment generated by the ASR application 132B. When the NLU application 134B receives a text segment, the NLU application 134B concatenates the text segment with other previously acquired text segments to form a concatenated text string. The NLU application 134B applies text prediction to the concatenated text string to predict the next words received from the ASR application 132B. In addition, the NLU application 134B performs intent matching to generate a predicted intent based on the concatenated text string.

As the NLU application 134B receives and processes text segments corresponding to a particular, the NLU application 134B continually determines position in the text string corresponding to the end of an utterance. In so doing, the NLU application 134B does not depend on a period of silence or a pause in the audio input. Instead, the NLU application 134B predicts the end of the current utterance within the text string. Based on the predicted end of the current utterance, the NLU application 134B predicts that the text following the predicted end of utterance corresponds to the beginning of the subsequent utterance. If the confidence score of the predicted end of utterance is greater than a threshold level, then the NLU application 134B cuts the text string at the point of the predicted end of utterance. The text following the predicted end of utterance is not appended to the prior text string. Instead, the text following the predicted end of utterance begins a new text string for the subsequent utterance.

In some embodiments, after predicting the end of an utterance, the NLU application 134B continually determines whether the prediction of the end of the utterance was correct. For example, if, after the predicted end of the utterance, the user continues to speak, the NLU application 134B could determine that the previously predicted end of utterance was incorrect. The NLU application 134B would then perform one or more actions to correct the error. For example, the NLU application 134B could cause the AI response application 136B to stop an AI response in progress, such as a verbal reply. The NLU application 134B could then continue to wait and listen for the user to complete the utterance.

In operation, the AI response application 136B performs natural language generation (NLG) which generates or writes a sentence and/or other response for an AI system to "say." Typically, the main focus of NLG is to generate a text response that is transmitted to a text-to-speech (TTS) application (not shown) to perform speech synthesis by translating the text response into an auditory signal. The NLG also generates non-speech responses such as a change in facial expression or body position that is consistent with the predicted intent and sentiment received from the NLU application 134B.

In particular, the AI response application 136B generates one or more responses that correspond to the received predicted intent and sentiment. As time progresses, the AI response application 136B receives additional predicted intents from the NLU application 134B. The AI response application 136B determines which predicted intents correspond to the same user utterance or phonological phrase. The AI response application 136B continues to update the response and generate new responses each time a new predicted intent is received from the NLU application 134B. The AI response is based on the new predicted intent as well as previously received predicted intents that correspond to the same user utterance or phonological phrase.

In some embodiments, the AI response application 136B may initiate the AI response or begin preparing to respond based on partial inputs from the ASR application 132B and the NLU application 134B, even before the utterance is complete. Further, the AI response application 136B may acquire additional information that may be needed to generate the AI response before the utterance is complete. As a result, the dialogue system 100 may further increase the speed and efficiency of generating AI responses. As a result, the ability of the dialogue system 100 to interact with the user in a more natural, human-like manner may be further improved.

In some embodiments, one or more of the ASR application 132B, the NLU application 134B, and the AI response application 136B may be implemented with a neural network approach, including, without limitation, a recurrent neural network (RNN) or a convolutional neural network (CNN). For example, a neural network could implement the language model of the ASR application 132B in order to disambiguate text segments that include homonyms, context-dependent words, and the like. Concurrently, the neural network could implement the text prediction of the NLU application 134B to predict the next potential text words that are received from the ASR application 132B. Concurrently, the neural network could determine the predicted intent based on text received from the ASR application 132B. As a result, the neural network simultaneously performs language model-based text disambiguation, text prediction to predict the next potential text input, and intent prediction based on the previously received text input. As further described herein, the ASR application 132B and the NLU application 134B are interlinked and may be included in a single application that performs the functions of both the ASR application 132B and the NLU application 134B.

Techniques for performing incremental natural language understanding functions are now described in greater detail below in conjunction with FIGS. 2-5B.

Incremental Computer-Based Natural Language Understanding

Figure 2:
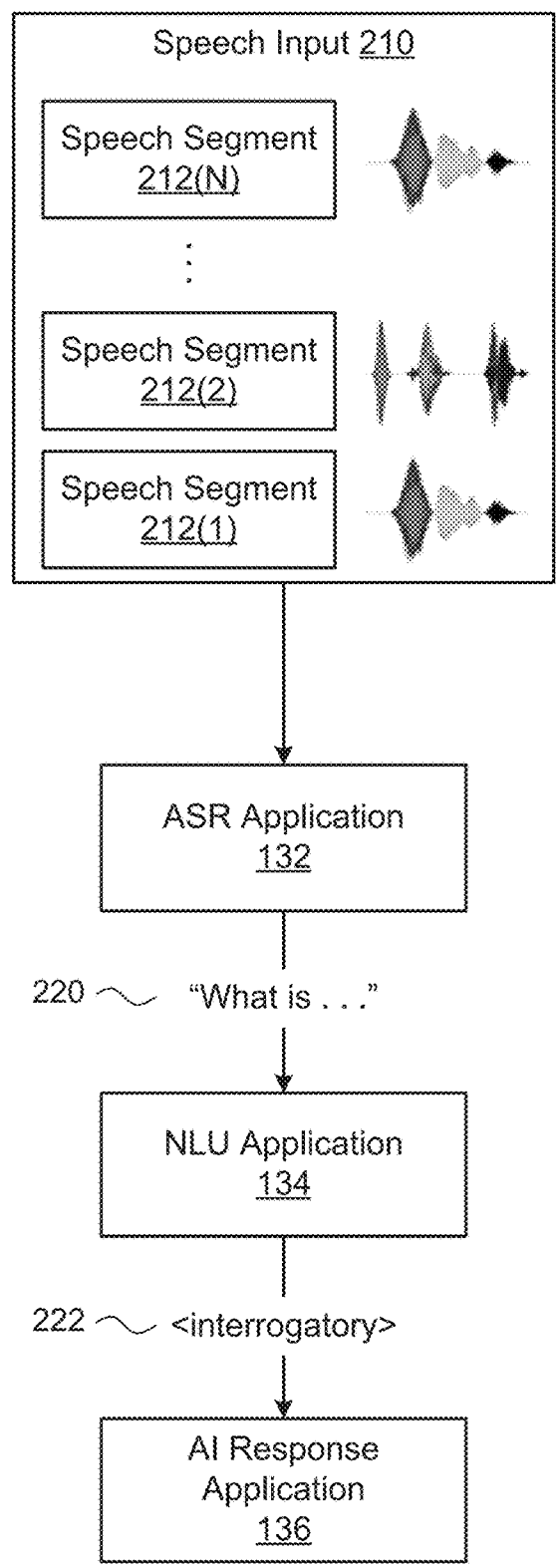
FIG. 2 illustrates how segments of audio speech are processed by the dialogue system of FIG. 1C, according to various embodiments.

FIG. 2 illustrates how segments of audio speech are processed by the dialogue system 100 of FIG. 1C, according to various embodiments. As shown, the illustration includes, without limitation, speech input 210, an ASR application 132B, an NLU application 134B, and an AI response application 136B.

The speech input 210 is divided into speech segments 212(1), 212(2) . . . 212(N), also referred to herein as audio speech segments. The speech segments 212 are acquired sequentially via an audio input device, such as a microphone. Each speech segment 212 is of a particular duration of time. In one example, each speech segment 212 represents 200 ms. The time of 200 ms is approximately the time delay between when a human listener begins to hear someone speak and when the listener begins to understand and respond to what the speaker is saying.

Adjacent audio speech segments may be overlapping or non-overlapping. In one example, audio speech segments of duration 200 ms could overlap by 50 ms. In this example, the first audio speech segment would represent a time of 0-200 ms. The second audio speech segment would represent a time of 150-350 ms. The third audio speech segment would represent a time of 300-500 ms, and so on. In another example, audio speech segments of duration 200 ms could be non-overlapping. In this example, the first audio speech segment would represent a time of 0-200 ms. The second audio speech segment would represent a time of 200-400 ms. The third audio speech segment would represent a time of 400-600 ms, and so on.

In operation, the ASR application 132B receives each speech segment 212 in order, first receiving speech segment 212(1), then receiving speech segment 212(2), and so on. After receiving a speech segment 212, the ASR application 132B begins to generate a text segment that includes the characters and/or words represented by the speech segment 212. As shown, the ASR application 132B generates the text segment 220, consisting of the text segment 220 "What is," based on the audio in the received speech segment 212. The ASR application 132B continues to receive additional speech segments 212 and generates corresponding text segments. The ASR application 132B transmits each generated text segment to the NLU application 134B.

In operation, the NLU application 134B receives each text segment generated by the ASR application 132B. When the NLU application 134B receives the text segment 220 "What is," the NLU application 134B determines that the text segment 220 is part of an interrogative user utterance. Therefore, the NLU application 134B generates a predicted intent 222 indicating an interrogative user utterance. The NLU application 134B generates any technically feasible types of predicted intent for a user utterance, a phonological phrase, or a word. For example, the NLU application 134B could identify interrogative versus declarative user utterances. The NLU application 134B could further identify particular emotions reflected in a user utterance or phonological phrase. The NLU application 134B could further identify particular emotions that are elicited by a user utterance or phonological phrase, such as an intent to elicit sympathy or empathy. The NLU application 134B could further identify particular topics reflected in a user utterance or phonological phrase, such as color, type of animal, or person's name. The NLU application 134B could further identify words as nouns, verbs, adjectives, adverbs, and so on. The NLU application 134B transmits the sequence of predicted intents to the AI response application 136B.

In operation, the AI response application 136B generates one or more responses that correspond to the received predicted intent. As time progresses, the AI response application 136B receives additional predicted intents from the NLU application 134B. The AI response application 136B determines which predicted intents correspond to the same user utterance or phonological phrase. The AI response application 136B continues to update the response and generate new responses each time a new predicted intent is received from the NLU application 134B. The AI response is based on the new predicted intent as well as previously received predicted intents that correspond to the same user utterance or phonological phrase.

For example, the AI response application 136B could initially generate a default response, referred to herein as a "backchannel response," when the AI response application 136B does not have sufficient context to determine the predicted intent. Additionally or alternatively, the AI response application 136B could initiate a default response or could prepare to generate a default response or other default action. Such a default response or default action is referred to herein as a "backchannel response." Such a backchannel response is not context-specific to a particular intent. The AI response application 136B could then receive a predicted intent 222 identifying an interrogative. The AI response application 136B could generate a response that is context-specific to a particular intent. Such a context-specific response is referred to herein as an "artificial intelligence response" or "AI response." The AI response reflects an appropriate response for when a question is being asked. As the AI response application 136B receives additional predicted intents from the NLU application 134B, the AI response application 136B continues to update the AI response to be appropriate for the context represented by the relevant set of predicted intents.

The backchannel responses and AI responses include one or more textual responses, verbal responses, and visual responses, in any technical feasible combination. Textual responses are typically presented on a display device within a text box window of a text-based chatbot application. Additionally or alternatively, the backchannel responses and AI responses include one or more verbal responses, such as words, sighs, or other sounds presented. Verbal responses are typically presented as an audio output associated with an audio-based chatbot application or a digital AI avatar. Additionally or alternatively, the backchannel responses and AI responses include visual responses that change facial and/or bodily expressions of a digital AI avatar. In this regard, backchannel responses indicate that the NLU system is listening, such as generating a textual and/or audio output that says "uh-huh" and animating an AI avatar to look intently at the speaker. AI responses to an interrogatory include animating an AI avatar to furl the eyebrows and turn an ear towards the speaker, indicating that the NLU system is anticipating a question. As additional predicted intents are received, additional AI responses are generated to reflect particular emotions and expressions based on the context of the user utterance or phonological phrase.

In some embodiments, the ASR application 132B and the NLU application 134B may be combined into a single application. In such embodiments, the NLU system 100 performs incremental ASR and incremental NLU concurrently and interactively, as further described herein.

Figure 3:
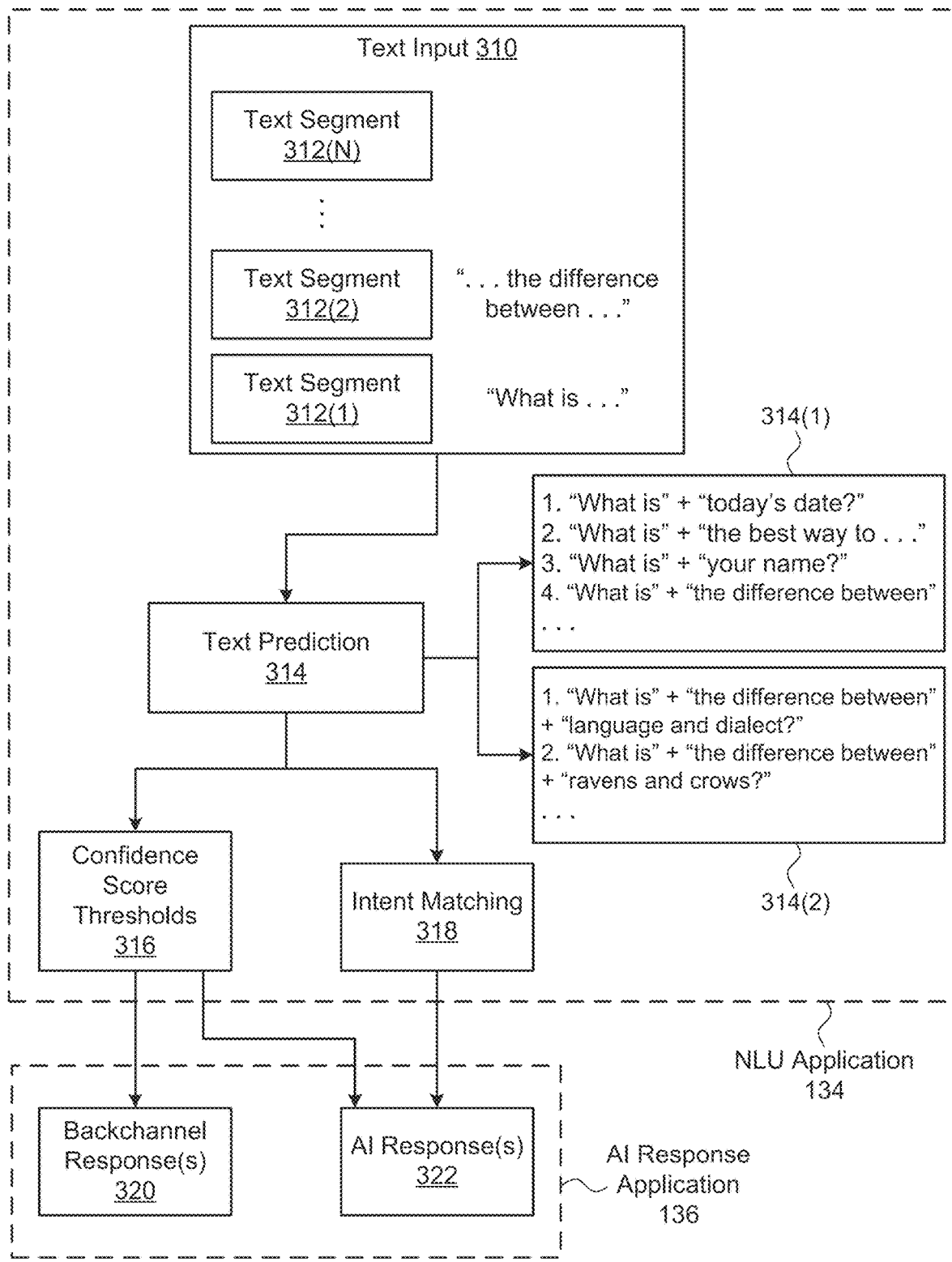
FIG. 3 is a more detailed illustration of the natural language understanding (NLU) application of FIG. 2, according to various embodiments.

FIG. 3 is a more detailed illustration of the natural language understanding (NLU) application 134B of FIG. 2, according to various embodiments. As shown, the NLU application 134B includes, without limitation, an NLU application 134B and an AI response application 136B. The NLU application 134B further includes text input 310, text prediction 314, confidence score thresholds 316, and intent matching 318. The illustration of FIG. 3 also includes the AI response application 136B which further includes backchannel response(s) 320 and AI response(s) 322.

The text input 310 is divided into text segments 312(1), 312(2) . . . 312(N). Each text segment corresponds to one or more speech segments 212 of FIG. 2, or a portion of one or more speech segments 212. Each text segment 312 includes text representing any technically feasible portion of a user utterance, including, without limitation, one or more characters, one or more words, or a phonological phrase.

In operation, text prediction 314 receives each text segment 312 in order, first receiving text segment 312(1), then receiving text segment 312(2), and so on. After receiving a text segment 312, text prediction 314 concatenates the text segment 312 with other relevant text segments 312 included in the same user utterance or phonological phrase, if any, and generates a concatenated text string. Text prediction 314 identifies one or more predicted text strings based on the concatenated text string. For example, text prediction 314 could identify a text string that includes the text string "What is" from text segment 312(1) as an interrogative user utterance. Text prediction 314 could identify a text string that includes the text string "What is the difference between" from text segments 312(1) and 312(2) as an interrogative user utterance that refers to a comparison. Text prediction 314 then predicts the text that is likely to be received in following text segments 312 based on text prediction entries, such as text prediction entries 314(1) and 314(2).

Given the text string "What is" from text segment 312(1), text prediction 314 applies text prediction entries 314(1) to identify potential phrases, such as "What is today's date?," "What is the best way to . . . ," "What is your name?," "What is the difference between . . . ," and so on. Text prediction 314 determines a confidence score for each of these potential phrases. The confidence score is a measure of the likelihood that the next text segments will form the corresponding potential phrase, based on the context of the text string received thus far.

Given the text string "What is the difference between" from text segments 312(1) and 312(2), text prediction 314 applies text prediction entries 314(2) to identify potential phrases, such as "What is the difference between language and dialect?," "What is the difference between ravens and crows?," and so on. Again, text prediction 314 determines a confidence score for each of these potential phrases. The confidence score is a measure of the likelihood that the next text segments will form the corresponding potential phrase, based on the context of the text string received thus far.

Given the context based on the current text string concatenated from one or more received text segments 312, text prediction 314 selects a most likely text segment, such as a potential phrase, based on the confidence scores for each of the potential phrases. The confidence score of the most likely potential phrase is compared to a confidence score threshold selected from a set of confidence score thresholds 316. The confidence score thresholds 316 include a single threshold value that text prediction 314 applies to any potential phrase identified by text prediction 314. Additionally or alternatively, the confidence score thresholds 316 include a different threshold value for each potential phrase identified by text prediction 314. Text prediction 314 selects the appropriate threshold value included in the confidence score thresholds 316.

Text prediction 314 compares the confidence score of the most likely potential phrase to the confidence score threshold selected from a set of confidence score thresholds 316. The confidence score thresholds 316 transmits a signal to AI response application 136B based on whether the confidence score is greater than or less than a corresponding confidence score threshold value. If the confidence score is less than the corresponding confidence score threshold value, then the confidence score thresholds 316 transmits a signal to the backchannel response(s) 320 section of the AI response application 136B. The backchannel response(s) 320 section of the AI response application 136B includes a non-intent specific response library of responses that are unrelated to a particular context or intent. The non-intent specific response library of responses includes responses that indicate that the NLU system 100 is still listening and processing audio speech input from the user. These responses do not correspond to the predicted intent determined by the NLU system 100. The AI response application 136B generates a response by selecting an appropriate response from the non-intent specific response library. The AI response application 136B causes the chatbot, personal digital assistant, AI avatar, or other responder associated with the NLU system 100 to produce the generated response.

If the confidence score is greater than the corresponding confidence score threshold value, then the confidence score thresholds 316 transmits a signal to the AI response(s) 322 section of the AI response application 136B. The AI response(s) 322 section of the AI response application 136B includes an intent specific response library of responses that are related to particular contexts or intents. The intent specific response library of responses includes responses that indicate that the NLU system 100 is responding to the predicted intent indicated by the content of the text input 310. These responses correspond to the predicted intent determined by the NLU system 100. The AI response application 136B generates a response by selecting an appropriate response from the intent specific response library, based on the predicted intent. The AI response application 136B causes the chatbot, personal digital assistant, AI avatar, or other responder associated with the NLU system 100 to produce the generated response.

In general, the confidence score for a short text string is likely to be relatively low. As additional text segments 312 are received and concatenated to the text string, the text string increases in length. Correspondingly, the confidence score tends to increase as each text segment 312 is received and as the text string increases in length.

Intent matching 318 identifies a predicted intent based on the potential phrase identified by text prediction 314. Intent matching 318 then pairs, or matches, the predicted intent with a response that is appropriate for the predicted intent. Intent matching transmits the intent-response pairs to the AI response(s) 322 section of the AI response application 136B. Upon receiving a signal from the confidence score thresholds 316 and a corresponding intent-response pair from intent matching 318, the AI response application 136B causes the chatbot, personal digital assistant, AI avatar or other responder associated with the NLU system 100 to generate the appropriate AI response specified by the intent-response pair.

Certain predicted intents are not associated with corresponding responses, such as certain factual statements. If intent matching 318 identifies such an intent, then the AI response application 136B does not generate any type of response, regardless of the corresponding confidence score. Additionally or alternatively, the AI response application 136B generates one or more backchannel response(s) 320. For example, depending on other programmed elements of personality for the chatbot, personal digital assistant, AI avatar or other responder, the AI response application 136B could generate a verbal or nonverbal response that represents agreement or incredulity. A verbal or nonverbal response that represents agreement would indicate that the chatbot, personal digital assistant, AI avatar or other responder already knew the fact associated with the utterance. A verbal or nonverbal response that represents incredulity would indicate that the chatbot, personal digital assistant, AI avatar or other responder did not already know the fact associated with the utterance.

If intent matching 318 subsequently identifies an intent that does have a corresponding response, and the confidence score is greater than the threshold value, then the AI response application 136B generates the corresponding response.

In some embodiments, intent matching 318 performs intent prediction at multiple levels in a hierarchical structure. In one example, intent matching 318 could perform intent prediction at a first level to identify a broad intent, such as a "restaurant." Intent matching 318 could then perform intent prediction at a second level to identify a restaurant that serves a particular type of cuisine, such as French, Italian, or American. Intent matching 318 could then perform intent prediction at a third level to identify particular dishes for each particular type of cuisine, and so on.

Figure 4:
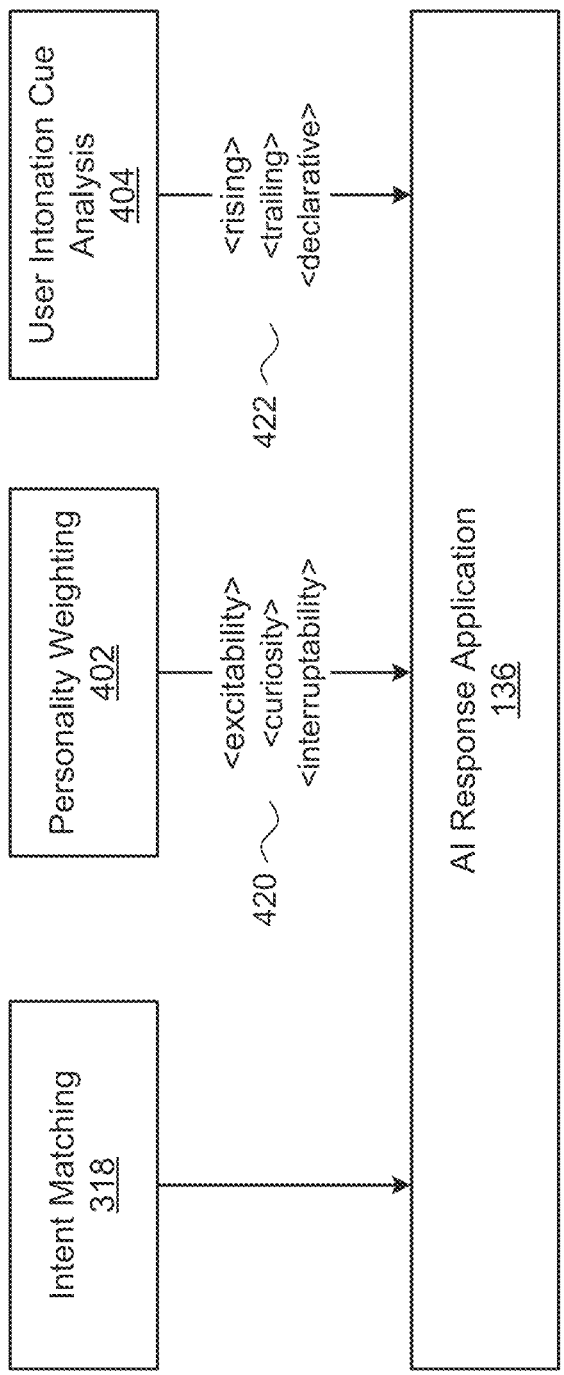
FIG. 4 illustrates a multi-modal version of the artificial intelligence (AI) response application of FIG. 1C, according to various embodiments.

FIG. 4 illustrates a multi-modal version of the artificial intelligence (AI) response application 136B of FIG. 1C, according to various embodiments. As shown, the AI response application 136B includes, without limitation, intent matching 318, personality weighting 402, user intonation cues analysis 404, and an AI response application 136B.

As further described herein, intent matching 318 is included in the NLU application 134B shown in FIGS. 1-2. In operation, intent matching 318 generates predicted intents and transmits the predicted intents to the AI response application 136B.

In operation, personality weighting 402 generates personality markers and transmits the personality markers to the AI response application 136B. The personality markers affect the perceived personality of the NLU system 100 when generating responses. As shown, personality weighting 402 generates and transmits personality markers to the AI response application 136B. The personality markers 420 include, without limitation, an excitability personality marker, a curiosity personality marker, and an interruptability personality marker. These personality markers adjust the backchannel responses and AI responses to cause the chatbot, personal digital assistant, AI avatar or other responder associated with the NLU system 100 to be more or less excitable, more or less curious, and more or less likely to interrupt the speaker. In addition, in some embodiments, these personality markers may be linked to socio-cultural factors regarding the user, in order to better match the AI responses to the user's cultural norms. For example, if the user is from a culture that typically has a higher degree of interruption as a marker of social engagement, then the interruptability marker would increase to match that of the user. These marker thresholds could be sensitive to known input about the user, and also be flexible to adjust throughout the conversation, in order to approximate the user's actual behavior patterns. Additionally or alternatively, personality weighting 402 generates any one or more other technically feasibility personality markers. The personality markers affect any technically feasible combination of textual responses, verbal responses, and visual responses.

The personality markers may be in any technically feasible format, including, without limitation, binary, discrete enumerated type, and numerically weighted. A binary personality marker has two states and indicates whether a corresponding personality trait is present or absent. A discrete enumerated type personality marker has multiple discrete values that indicate various levels or types of a corresponding personality trait. For example, a discrete enumerated type personality marker could have one of five possible values, corresponding to five levels or types of the corresponding personality trait. A numerically weighted personality marker has a numerical value that represents the relative strength or probability of a corresponding personality trait. For example, a numerical weighted personality marker could have any value between 0.00 and 1.00.

In operation, user intonation cues analysis 404 receives the speech input 210 of FIG. 2, generates user intonation cues based on the speech input 210, and transmits the user intonation cues to the AI response application 136B. The user intonation cues may affect any technically feasible combination of textual responses, verbal responses, and visual responses of the AI response application 136B when generating responses. As shown, user intonation cues analysis 404 generates and transmits user intonation cues to the AI response application 136B. The intonation cues 422 include, without limitation, a rising intonation cue, a trailing intonation cue, and a declarative intonation cue. A rising intonation cue typically indicates an interrogative user utterance. A trailing or declarative intonation typically indicates a declarative user utterance. Additionally or alternatively, user intonation cues analysis 404 generates any one or more other technically feasibility user intonation cues. In some embodiments, the ASR application 132B and the NLU application 134B may be combined into a single application. In such embodiments, user intonation cues analysis 404 may be included in the single application. The combined application may generate predicted intents and user intonation cues. The combined application may then transmit both the predicted intents and user intonation cues to the AI response application 136B.

As described herein, the AI response application 136B generates backchannel response(s) 320 and AI response(s) 322 based on predicted intents received from the intent matching 318 section of the NLU application 134B. In addition, in the multi-modal version of natural language understanding, the AI response application 136B receives data based additional types of processing to enhance the backchannel response(s) 320 and AI response(s) 322. These additional types of processing include personality weighting 402 and user intonation cues analysis 404. The AI response application 136B generates and/or modifies the backchannel response(s) 320 and AI response(s) 322 based on the personality weighting 402 and the user intonation cues analysis 404. In some embodiments, the AI response application 136B further analyzes information from one or more video feeds (not shown) of the speaker as the speaker is talking and as the speaker is reacting to responses generated by the AI response application 136B. Based on the analysis of the video feeds, the AI response application 136B determines an additional predicted intent. The AI response application 136B generates and/or modifies the backchannel response(s) 320 and AI response(s) 322 based on the additional predicted intent derived from the video feeds. In this manner, the AI response application 136B generates responses that are appropriate to the predicted intents received from intent matching 318, avatar personality data received from personality weighting 402, intonation data received from user intonation cues analysis 404, and video feed data of the speaker.

Figure 5A:
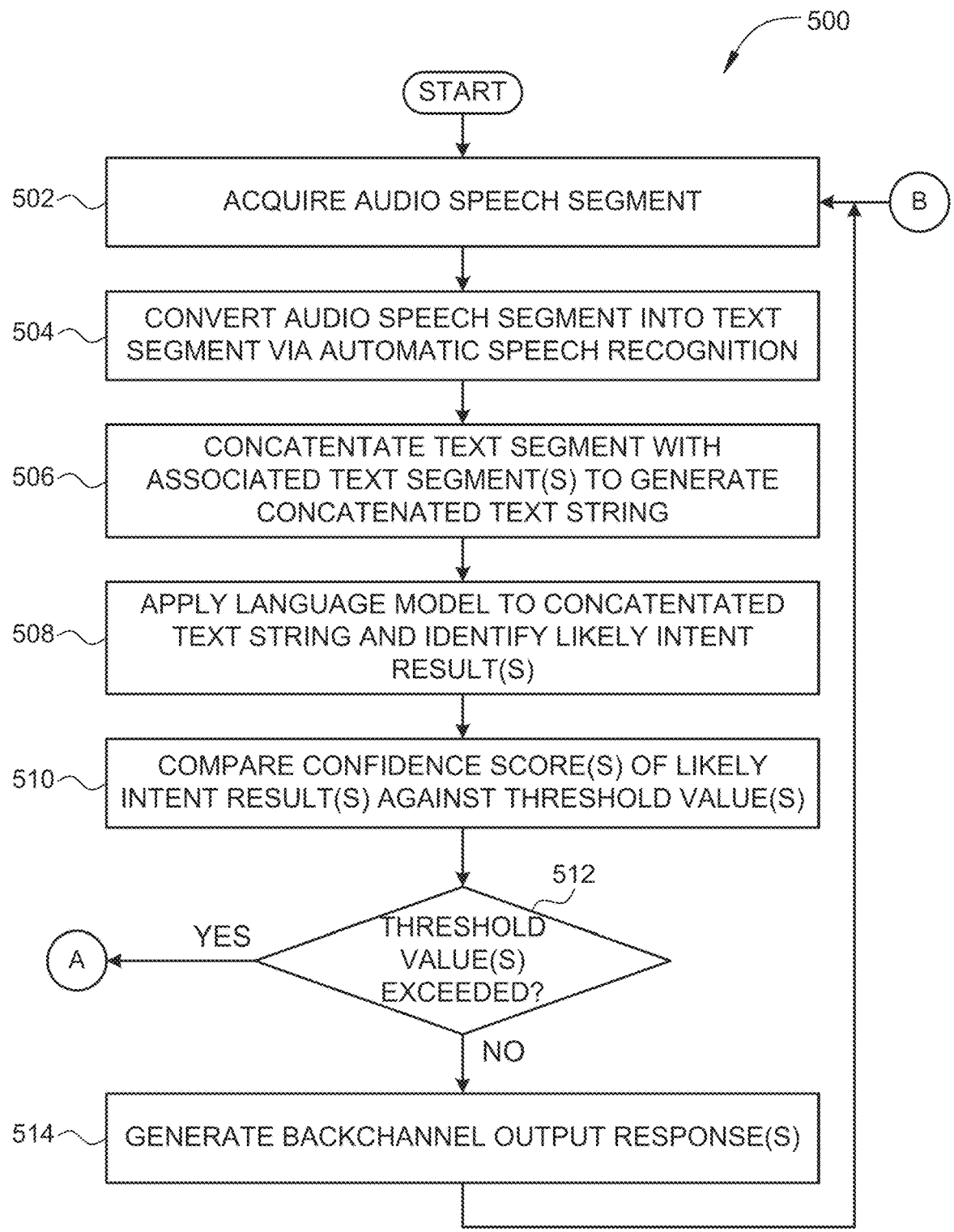
FIGS. 5A-5B set forth a flow diagram of method steps for performing incremental computer-based natural language understanding, according to various embodiments.
Figure 5B:
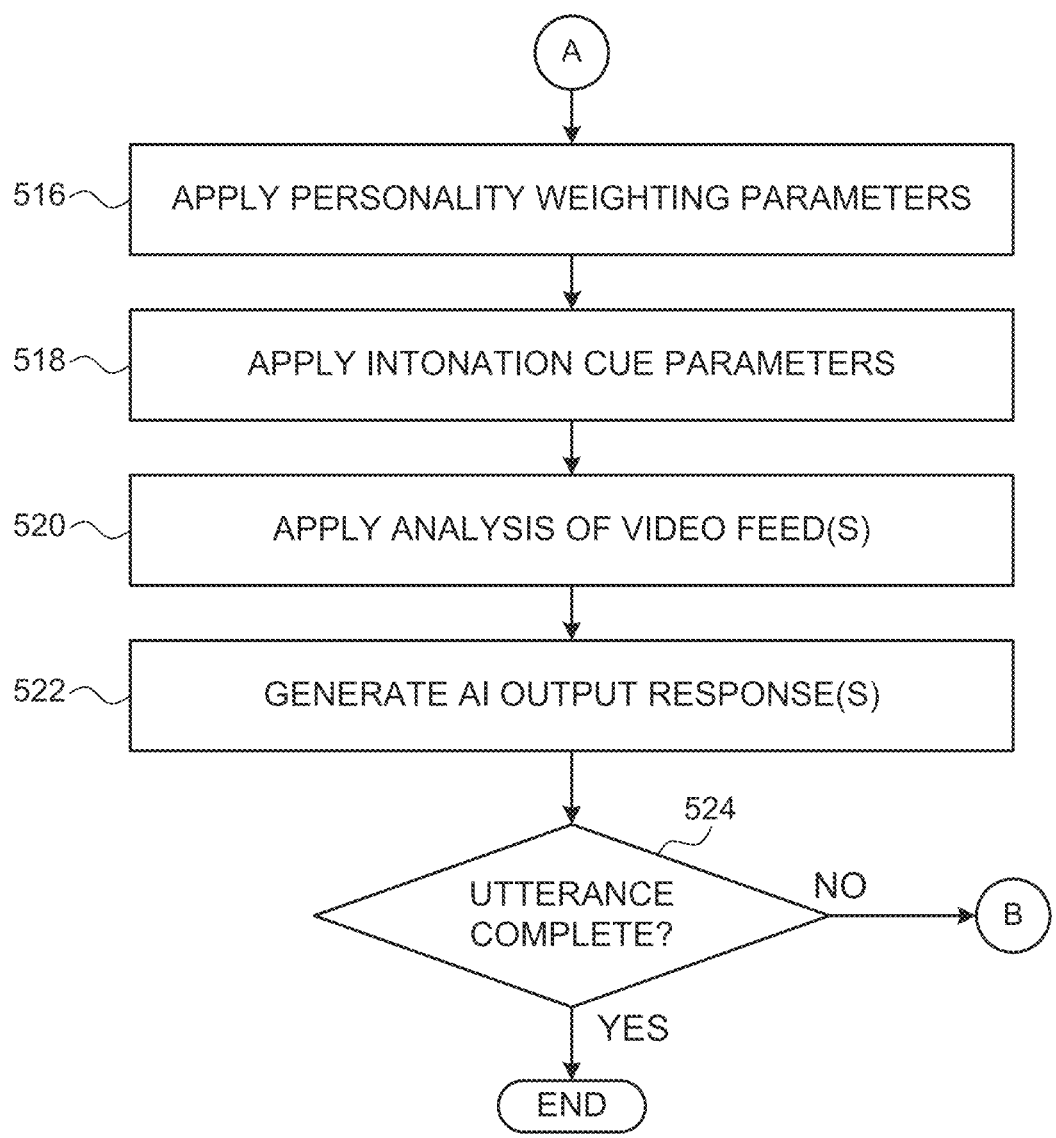

FIGS. 5A-5B set forth a flow diagram of method steps for performing incremental computer-based natural language understanding, according to various embodiments. Although the method steps are described in conjunction with the systems of FIGS. 1-4, persons of ordinary skill in the art will understand that any system configured to perform the method steps, in any order, is within the scope of the various embodiments.

As shown, a method 500 begins at step 502, where an ASR application 132B executing on n dialogue system 100 acquires an audio speech segment. The ASR application 132B receives the audio speech segment via an audio input device, such as a microphone, and converts the audio speech segment into digital samples by an analog-to-digital converter (ADC). Additionally or alternatively, the ASR application 132B retrieves the digital samples representing the audio speech segment from a memory. In such cases, the audio speech segment has been previously received via an audio input device, converted into digital samples by an ADC, and stored in the memory.

In general, the audio speech segment is included in a set of multiple audio speech segments spoken by a human speaker. The set of multiple audio speech segments typically represent a user utterance, such as a question, a declarative statement, or other user utterance, or any subset thereof. Each audio speech segment has a particular duration. In one example, each audio speech segment could represent a duration of 200 ms. Adjacent audio speech segments may be overlapping or non-overlapping. In one example, audio speech segments of duration 200 ms could overlap by 50 ms. In this example, the first audio speech segment would represent a time of 0-200 ms. The second audio speech segment would represent a time of 150-350 ms. The third audio speech segment would represent a time of 300-500 ms, and so on. In another example, audio speech segments of duration 200 ms could be non-overlapping. In this example, the first audio speech segment would represent a time of 0-200 ms. The second audio speech segment would represent a time of 200-400 ms. The third audio speech segment would represent a time of 400-600 ms, and so on.

At step 504, the ASR application 132B converts the audio speech segment into a text segment via an automatic speech recognition process. The resulting text segment includes one or more characters that represent a portion of one or more words. Additionally or alternatively, the resulting text segment includes one or more words that represent a portion of a user utterance or phonological phrase.

At step 506, an NLU application 134B, in conjunction with text prediction 314, executing on the dialogue system 100 concatenates the text segment with one or more associated text segments to generate a concatenated text string. If the current text segment is the first text segment of a user utterance, then the concatenated text string represents only the current text segment. If, on the other hand, the current text segment is not the first text segment of a user utterance, then the concatenated text string represents the current text segment appended to one or more previously acquired text segments within the same user utterance.

At step 508, the NLU application 134B, in conjunction with text prediction 314, applies text prediction to the concatenated text string and identifies one or more predicted text results. In particular, the NLU application 134B applies text prediction 314 to the concatenated text string to predict the next words received from the ASR application 132B. In addition, the NLU application 134B performs intent matching to generate a predicted intent based on the concatenated text string.

At step 510, the NLU application 134B compares confidence scores of predicted intent results against one or more corresponding threshold values. The confidence score threshold values include a single threshold value that applies to any predicted intent. Additionally or alternatively, the confidence score threshold values include a different threshold value for each predicted intent. The NLU application 134B selects the appropriate threshold value for the predicted intent.

At step 512, the NLU application 134B determines whether one or more confidence scores are greater than or less than a corresponding threshold value. If all confidence scores are less than a corresponding threshold value, then the method 500 proceeds to step 514, where an AI response application 136B executing on the dialogue system 100 generates one or more backchannel output responses. The method then proceeds to step 502, describe above. The backchannel output responses may include any technically feasible combination of textual responses, verbal responses, and visual responses.

Returning to step 512, if one or more confidence scores are greater than a corresponding threshold value, then the method 500 proceeds to step 516, where the AI response application 136B applies personality weighting parameters to modify one or more AI responses. The personality markers include, without limitation, an excitability personality marker, a curiosity personality marker, and an interruptability personality marker. At step 518, the AI response application 136B applies intonation cues to modify the one or more AI responses. The intonation cues include, without limitation, a rising intonation cue, a trailing intonation cue, and a declarative intonation cue. At step 520, the AI response application 136B analyzes one or more video feeds to modify the one or more AI responses. More specifically, based on the analysis of the video feeds, the AI response application 136B determines an additional predicted intent. The AI response application 136B generates and/or modifies the one or more AI responses based on the additional predicted intent derived from the video feeds.

At step 522, the AI response application 136B generates one or more AI responses. The AI output responses may include any technically feasible combination of textual responses, verbal responses, and visual responses.

At step 524, the NLU application 134B determines whether the user utterance represented by the current concatenated text string is complete. If the user utterance represented by the current concatenated text string is not complete, then the method 500 proceeds to step 502, described above. If, on the other hand, the user utterance represented by the current concatenated text string is complete, then the method 500 terminates. Alternatively, the method 500 clears the concatenated text string and proceeds to step 502 to process an additional user utterance.

In sum, techniques are disclosed for performing incremental natural language understanding (NLU). An NLU system acquires audio speech segments of short duration, such as 200 ms. The NLU system converts each audio speech segment into a text segment via an automatic speech recognition process. The resulting text segment includes one or more letters that represent a portion of one or more words. Additionally or alternatively, the resulting text segment includes one or more words that represent a portion of a user utterance. The NLU system concatenates the text segment with other previously acquired text segments belonging to the same user utterance, thereby generating a concatenated text string. The NLU system then identifies one or more predicted intent results based on the concatenated text string. If the NLU system determines that the confidence scores for the predicted intent results are less than corresponding threshold values, then the NLU system generates one or more backchannel responses that are not context-specific. If, on the other hand, the NLU system determines that one or more confidence scores for the predicted intent results are greater than corresponding threshold values, then the NLU system generates one or more context-specific AI responses.

As the NLU system acquires and processes additional audio speech segments of short duration, the NLU system generates a more complete context of the user utterance being spoken and, correspondingly, an increasingly refined model of the predicted intent of the speaker. In response, the NLU system continues to generate backchannel responses and AI responses that correspond to this increasingly complete and refined model of the predicted intent of the speaker. In addition, the NLU system modifies the backchannel responses and AI responses with personality markers that define various personality traits of the chatbot, personal digital assistant, AI avatar or other responder associated with the NLU system. The NLU system further modifies the backchannel responses and AI responses based intonation cues detected from the audio speech input, such as whether the speaker's voice is rising or trailing. The NLU system further modifies the backchannel responses and AI responses based on analysis of one or more video feeds of the speaker who is generating the user utterance.

At least one technical advantage of the disclosed techniques relative to the prior art is that the disclosed techniques enable a dialogue system to verbally and/or visually respond to audio received from a user as the user is speaking, without having to wait for the user to finish speaking. Thus, the disclosed techniques allow the dialogue system to interact with the user in a more natural, "human-like" manner, thereby enhancing the overall user experience. These technical advantages represent one or more technological advancements over prior art approaches.

1. In some embodiments, a computer-implemented method performs incremental natural language understanding by: acquiring a first audio speech segment associated with a user utterance; converting the first audio speech segment into a first text segment; determining a first intent based on a text string associated with the first text segment, wherein the text string represents a portion of the user utterance; and generating a first response based on the first intent prior to when the user utterance completes.

2. The computer-implemented method according to clause 1, further comprising determining that a confidence score associated with the first intent is greater than a threshold value, wherein generating the first response comprises performing one or more operations based on an intent specific response library to generate a response that is related to the first intent.

3. The computer-implemented method according to clause 1 or clause 2, further comprising determining that a confidence score associated with the first intent is less than a threshold value, wherein generating the first response comprises performing one or more operations based on a non-intent specific response library to generate a response that is unrelated to the first intent.

4. The computer-implemented method according to any of clauses 1-3, further comprising: acquiring a second audio speech segment associated with the user utterance; converting the second audio speech segment into a second text segment; concatenating the second text segment to the text string to generate a concatenated text string; determining a second intent based on the concatenated text string that is different than the first intent; and generating a second response based on the second intent prior to when the user utterance completes.

5. The computer-implemented method according to any of clauses 1-4, further comprising: applying text prediction to the text string to determine a second text segment that is likely to follow the first text segment; and prior to determining the first intent, concatenating the second text segment to the text string.

6. The computer-implemented method according to any of clauses 1-5, further comprising: determining a personality attribute weighting of an artificial intelligence avatar associated with the first response; and modifying the first response based on the personality attribute weighting.

7. The computer-implemented method according to any of clauses 1-6, wherein the personality attribute weighting includes at least one of an excitability weighting, a curiosity weighting, and an interruptability weighting.

8. The computer-implemented method according to any of clauses 1-7, further comprising: determining an intonation cue associated with the first audio speech segment; and modifying the first response based on the intonation cue.

9. The computer-implemented method according to any of clauses 1-8, wherein the intonation cue includes at least one of a rising intonation, a trailing intonation, and a declarative intonation.

10. The computer-implemented method according to any of clauses 1-9, further comprising: analyzing a video feed associated with the user utterance; determining a second intent based on the video feed; and modifying the first response based on the second intent.

11. In some embodiments, one or more non-transitory computer-readable media store program instructions that, when executed by one or more processors, cause the one or more processors to perform the steps of: acquiring a first audio speech segment associated with a user utterance; converting the first audio speech segment into a first text segment; concatenating the first text segment to a text string that represents a portion of the user utterance; determining a first intent based on the text string; and generating a first response based on the first intent prior to when the user utterance completes.

12. The one or more non-transitory computer-readable media according to clause 11, further comprising determining that a confidence score associated with the first intent is greater than a threshold value, wherein generating the first response comprises performing one or more operations based on an intent specific response library to generate a response that is related to the first intent.

13. The one or more non-transitory computer-readable media according to clause 11 or clause 12, further comprising determining that a confidence score associated with the first intent is less than a threshold value, wherein generating the first response comprises performing one or more operations based on a non-intent specific response library to generate a response that is unrelated to the first intent.

14. The one or more non-transitory computer-readable media according to any of clauses 11-13, further comprising: acquiring a second audio speech segment associated with the user utterance; converting the second audio speech segment into a second text segment; concatenating the second text segment to the text string to generate a concatenated text string; determining a second intent based on the concatenated text string that is different than the first intent; and generating a second response based on the second intent prior to when the user utterance completes.

15. The one or more non-transitory computer-readable media according to any of clauses 11-14, wherein a first duration of time represented by the first second audio speech segment overlaps with a second duration of time represented by the second audio speech segment.

16. The one or more non-transitory computer-readable media according to any of clauses 11-15, wherein a first duration of time represented by the first second audio speech segment is non-overlapping with a second duration of time represented by the second audio speech segment.

17. The one or more non-transitory computer-readable media according to any of clauses 11-16, further comprising: applying text prediction to the text string to determine a second text segment that is likely to follow the first text segment; and prior to determining the first intent, concatenating the second text segment to the text string.

18. The one or more non-transitory computer-readable media according to any of clauses 11-17, further comprising: determining a personality attribute weighting of an artificial intelligence avatar associated with the first response; and modifying the first response based on the personality attribute weighting.

19. The one or more non-transitory computer-readable media according to any of clauses 11-18, further comprising: determining an intonation cue associated with the first audio speech segment; and modifying the first response based on intonation cue.

20. In some embodiments, a system comprises: a memory that includes instructions, and a processor that is coupled to the memory and, when executing the instructions, is configured to: acquire an audio speech segment associated with a user utterance; convert the audio speech segment into a text segment; determine an intent based on a text string associated with the text segment, wherein the text string represents a portion of the user utterance; and generate a response based on the intent prior to when the user utterance completes.

Any and all combinations of any of the claim elements recited in any of the claims and/or any elements described in this application, in any fashion, fall within the contemplated scope of the various embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for performing incremental natural language understanding, the method comprising:
    acquiring, by a dialogue system that includes at least one processor and a neural network, a first audio speech segment associated with a user utterance;
    converting the first audio speech segment into a first text segment;
    executing the neural network to predict a first intent based on a text string associated with the first text segment, wherein the text string represents a portion of the user utterance;
    determining a confidence score associated with the first intent;
    modifying at least one marker that is input into the neural network based on at least one of a user associated with the user utterance or a behavior pattern of the user;
    in response to determining that the confidence score is less than a threshold value, generating, using the neural network with the at least one modified marker, a first response that is unrelated to the first intent prior to when the user utterance completes, wherein the first response indicates that audio associated with the user utterance is being processed and is based on a non-intent specific response library; and
    in response to determining that the confidence score is greater than the threshold value:
        predicting an end of the user utterance based on the text string; and
        generating, using the neural network with the at least one modified marker, a second response based on the end of the user utterance.

2. The computer-implemented method of claim 1, further comprising determining that a second confidence score associated with a second intent is greater than the threshold value, and generating a third response by performing one or more operations based on an intent specific response library to generate a response that is related to the second intent.

3. The computer-implemented method of claim 1, further comprising:
    acquiring a second audio speech segment associated with the user utterance;
    converting the second audio speech segment into a second text segment;
    concatenating the second text segment to the text string to generate a concatenated text string;
    determining a second intent based on the concatenated text string that is different than the first intent; and
    generating a third response based on the second intent prior to the end of the user utterance.

4. The computer-implemented method of claim 1, further comprising:
    applying text prediction to the text string to determine a second text segment that is likely to follow the first text segment; and
    prior to determining the first intent, concatenating the second text segment to the text string.

5. The computer-implemented method of claim 1, further comprising:
    determining a personality attribute weighting of an artificial intelligence avatar associated with the first response; and
    modifying the first response based on the personality attribute weighting.

6. The computer-implemented method of claim 5, wherein the personality attribute weighting includes at least one of an excitability weighting, a curiosity weighting, and an interruptability weighting.

7. The computer-implemented method of claim 1, further comprising:
    determining an intonation cue associated with the first audio speech segment; and
    modifying the first response based on the intonation cue.

8. The computer-implemented method of claim 7, wherein the intonation cue includes at least one of a rising intonation, a trailing intonation, and a declarative intonation.

9. The computer-implemented method of claim 1, further comprising:
    analyzing a video feed associated with the user utterance;
    determining a second intent based on the video feed; and
    modifying the first response based on the second intent.

10. One or more non-transitory computer-readable media storing program instructions that, when executed by one or more processors, cause the one or more processors to perform the steps of:
    acquiring, by a dialogue system that includes at least one processor and a neural network, a first audio speech segment associated with a user utterance;
    converting the first audio speech segment into a first text segment;
    concatenating the first text segment to a text string that represents a portion of the user utterance;
    executing the neural network to predict a first intent based on the text string;
    determining a confidence score associated with the first intent;
    modifying at least one marker that is input into the neural network based on at least one of a user associated with the user utterance or a behavior pattern of the user;
    in response to determining that the confidence score is less than a threshold value, generating, using the neural network with the at least one modified marker, a first response that is unrelated to the first intent prior to when the user utterance completes, wherein the first response indicates that audio associated with the user utterance is being processed and is based on a non-intent specific response library; and in response to determining that the confidence score is greater than the threshold value:

predicting an end of the user utterance based on the text string; and generating, using the neural network with the at least one modified marker, a second response based on the end of the user utterance.

11. The one or more non-transitory computer-readable media of claim 10, further comprising determining that a second confidence score associated with a second intent is greater than the threshold value, and generating a third response by performing one or more operations based on an intent specific response library to generate a response that is related to the second intent.

12. The one or more non-transitory computer-readable media of claim 10, further comprising:

acquiring a second audio speech segment associated with the user utterance;

converting the second audio speech segment into a second text segment;

concatenating the second text segment to the text string to generate a concatenated text string;

determining a second intent based on the concatenated text string that is different than the first intent; and generating a third response based on the second intent prior to the end of the user utterance.

13. The one or more non-transitory computer-readable media of claim 12, wherein a first duration of time represented by the first audio speech segment overlaps with a second duration of time represented by the second audio speech segment.

14. The one or more non-transitory computer-readable media of claim 12, wherein a first duration of time represented by the first audio speech segment is non-overlapping with a second duration of time represented by the second audio speech segment.

15. The one or more non-transitory computer-readable media of claim 10, further comprising:

applying text prediction to the text string to determine a second text segment that is likely to follow the first text segment; and prior to determining the first intent, concatenating the second text segment to the text string.

16. The one or more non-transitory computer-readable media of claim 10, further comprising:

determining a personality attribute weighting of an artificial intelligence avatar associated with the first response; and modifying the first response based on the personality attribute weighting.

17. The one or more non-transitory computer-readable media of claim 10, further comprising:

determining an intonation cue associated with the first audio speech segment; and modifying the first response based on the intonation cue.

18. A system, comprising:

one or more memories that include instructions, and one or more processors that are coupled to the one or more memories and, when executing the instructions, perform the steps of:

acquiring, by a dialogue system that includes a neural network, an audio speech segment associated with a user utterance;

converting the audio speech segment into a text segment;

executing the neural network to predict a first intent based on a text string associated with the text segment, wherein the text string represents a portion of the user utterance;

determining a confidence score associated with the first intent;

modifying at least one marker that is input into the neural network based on at least one of a user associated with the user utterance or a behavior pattern of the user;

in response to determining that the confidence score is less than a threshold value, generating, using the neural network with the at least one modified marker, a first response that is unrelated to the first intent prior to when the user utterance completes, wherein the first response indicates that audio associated with the user utterance is being processed and is based on a non-intent specific response library; and in response to determining that the confidence score is greater than the threshold value:

predicting an end of the user utterance based on the text string; and generating, using the neural network with the at least one modified marker, a second response based on the end of the user utterance.

* * * * *